US012119566B2

(12) United States Patent
Hsu et al.

(10) Patent No.: US 12,119,566 B2
(45) Date of Patent: Oct. 15, 2024

(54) COMMUNICATION DEVICE

(71) Applicant: Wistron NeWeb Corp., Hsinchu (TW)

(72) Inventors: Yuan-Chia Hsu, Hsinchu (TW); Chin-Lung Yeh, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 169 days.

(21) Appl. No.: 17/811,635

(22) Filed: Jul. 11, 2022

(65) Prior Publication Data

US 2023/0163470 A1 May 25, 2023

(30) Foreign Application Priority Data

Nov. 19, 2021 (TW) ................................ 110143114

(51) Int. Cl.
*H01Q 9/04* (2006.01)
*H01Q 1/52* (2006.01)
*H01Q 5/40* (2015.01)

(52) U.S. Cl.
CPC ........... *H01Q 9/0414* (2013.01); *H01Q 1/521* (2013.01); *H01Q 5/40* (2015.01)

(58) Field of Classification Search
CPC ........ H01Q 9/0414; H01Q 5/40; H01Q 1/521; H05K 1/16; H05K 1/165; H05K 1/162; H01P 1/20336
See application file for complete search history.

(56) References Cited

U.S. PATENT DOCUMENTS 2,851,613 A * 9/1958 Welker ............... G05D 23/2237 361/158
3,413,574 A * 11/1968 Schroeder ................ H01Q 3/26 333/25
4,342,012 A * 7/1982 Inaba ................ H03H 9/02559 331/107 A (Continued)

FOREIGN PATENT DOCUMENTS

CN 205792477 U * 12/2016
CN 206349489 U * 7/2017

(Continued)

*Primary Examiner* — Ricardo I Magallanes
*Assistant Examiner* — Jordan E. DeWitt
(74) *Attorney, Agent, or Firm* — McClure, Qualey & Rodack, LLP

(57) ABSTRACT

A communication device includes a first ground element, a second ground element, a third ground element, a first signaling conductor, a second signaling conductor, a resonant circuit, and a dielectric substrate. The first signaling conductor is disposed between the first ground element and the second ground element. The second signaling conductor is disposed between the second ground element and the third ground element. The first signaling conductor is coupled through the resonant circuit to the first ground element. The dielectric substrate has a first surface and a second surface opposite to each other. The first ground element, the second ground element, the third ground element, the first signaling conductor, and the second signaling conductor are disposed on the first surface of the dielectric substrate. The resonant circuit is configured to increase the isolation between the first signaling conductor and the second signaling conductor in a target frequency band.

14 Claims, 8 Drawing Sheets

(56) References Cited

U.S. PATENT DOCUMENTS 4,600,906 A * 7/1986 Blight ..................... H01P 1/218 333/205
5,023,768 A * 6/1991 Collier ..................... H05G 1/10 336/185
6,078,295 A * 6/2000 Rawle ...................... H01Q 9/32 343/792
6,300,906 B1 * 10/2001 Rawnick .................. H01Q 1/38 343/700 MS
8,200,301 B2 * 6/2012 Yamamoto ............... H01Q 9/16 370/339
8,654,743 B1 * 2/2014 Li ........................... H01Q 3/24 370/278
10,630,257 B2 * 4/2020 Nosaka .............. H03H 9/14541
11,075,050 B2 * 7/2021 Wang ....................... H01Q 1/46
2003/0030589 A1 * 2/2003 Zurcher ................. G04G 21/04 343/718
2003/0222732 A1 * 12/2003 Matthaei ............. H01P 1/20381 333/204
2004/0160367 A1 * 8/2004 Mendolia ............... H01Q 1/521 343/749
2004/0212039 A1 * 10/2004 Yamamoto .......... H01L 27/0682 257/E23.114
2004/0217915 A1 * 11/2004 Imaizumi ................. H03H 7/38 343/860
2005/0092845 A1 * 5/2005 Forster ............. G06K 19/07749 235/492
2005/0225484 A1 * 10/2005 Kuramoto .............. H01Q 1/243 343/702
2006/0117163 A1 * 6/2006 Okuyama ............ H05K 1/0218 712/1
2006/0152430 A1 * 7/2006 Seddon .................. H01Q 17/00 343/909
2007/0001785 A1 * 1/2007 Yamanaka ......... H03H 9/02779 333/193
2007/0133182 A1 * 6/2007 Chen .................... H03H 7/1775 361/748
2008/0136736 A1 * 6/2008 Proctor .................... H01Q 5/50 343/893
2008/0174508 A1 * 7/2008 Iwai ......................... H01Q 9/30 343/850
2009/0284431 A1 * 11/2009 Meharry ................ H01Q 9/065 343/822
2010/0060535 A1 * 3/2010 Tiezzi .................. H01Q 1/3275 343/770
2011/0018776 A1 * 1/2011 Brown ................... H01Q 21/28 343/788
2011/0115676 A1 * 5/2011 Tatarnikov ........... H01Q 9/0414 343/700 MS
2012/0064954 A1 * 3/2012 Kato ...................... H01Q 1/243 343/751
2012/0127038 A1 * 5/2012 Kim ......................... H01Q 9/42 343/700 MS
2012/0194290 A1 * 8/2012 Wu ....................... H01P 1/2039 333/246
2013/0123726 A1 * 5/2013 Yu .......................... H01Q 1/273 235/492
2013/0257674 A1 * 10/2013 Li ............................ H01Q 9/42 343/853
2013/0335280 A1 * 12/2013 Chen, III ............... H01Q 21/30 343/745
2014/0021591 A1 * 1/2014 Sung ................... H01L 23/5225 257/659
2014/0139391 A1 * 5/2014 Lo .......................... H01Q 21/28 343/841
2014/0159981 A1 * 6/2014 Wang ..................... H01Q 1/521 343/841
2014/0320351 A1 * 10/2014 Wei ........................ H01Q 5/335 343/700 MS
2015/0123869 A1 * 5/2015 Bit-Babik ............ H01Q 21/065 29/600
2015/0138036 A1 * 5/2015 Harper ..................... H01Q 1/48 29/601
2015/0295311 A1 * 10/2015 Bringuier ............... H01Q 1/521 343/729
2016/0043468 A1 * 2/2016 Onaka .................... H01Q 5/335 343/750
2016/0141749 A1 * 5/2016 Tagi ....................... H01Q 1/405 342/175
2017/0062932 A1 * 3/2017 Foster ...................... H01Q 1/38
2017/0279192 A1 * 9/2017 Taniguchi ................ H01Q 1/48
2017/0309405 A1 * 10/2017 Moalemi .................. H01G 4/33
2017/0352943 A1 * 12/2017 Sung ...................... H01Q 1/245
2018/0069301 A1 * 3/2018 Choi ........................ H01Q 9/42
2018/0083367 A1 * 3/2018 Song ...................... H01Q 1/243
2018/0090821 A1 * 3/2018 Lee .......................... H01Q 9/42
2018/0233811 A1 * 8/2018 Gommé ................. H01Q 13/10
2018/0277946 A1 * 9/2018 Murata .................... H01Q 1/48
2019/0027802 A1 * 1/2019 Noori ................... H01Q 19/005
2019/0103676 A1 * 4/2019 Sugimoto ................ H01Q 1/42
2019/0199001 A1 * 6/2019 Kato ........................ G06K 7/10
2019/0334225 A1 * 10/2019 Lee ........................ H01Q 1/243
2019/0348356 A1 * 11/2019 Hsieh ...................... H01F 27/40
2020/0098676 A1 * 3/2020 Elsherbini ............... H01L 23/36
2021/0066191 A1 * 3/2021 Chen ..................... H01L 23/645
2021/0066795 A1 * 3/2021 Flores-Cuadras .... H01Q 9/0407
2021/0111486 A1 * 4/2021 Tamrakar ............. H01Q 1/2266
2021/0159598 A1 * 5/2021 Hamabe ................. H01Q 9/045
2022/0173515 A1 * 6/2022 Koyama ................ H03B 7/146
2022/0393324 A1 * 12/2022 Sukegawa ............. H01P 11/003
2023/0163470 A1 * 5/2023 Hsu ..................... H01P 1/20363 343/702
2023/0198149 A1 * 6/2023 Wei ........................ H01Q 5/335 343/702
2023/0304980 A1 * 9/2023 Li ......................... C23C 16/407

FOREIGN PATENT DOCUMENTS

CN 109980364 A 7/2019
EP 2696437 A1 * 2/2014 ............... H01Q 1/48
EP 3340383 A1 * 6/2018 ............... H01Q 1/24
EP 3713013 A1 * 9/2020 ............. G01S 13/32
TW 793867 B1 * 2/2023 ............. H01Q 1/521
WO WO-2020158213 A1 * 8/2020 ............. B30B 11/08
WO WO-2020173298 A1 * 9/2020 ............... H01Q 1/50

* cited by examiner

COMMUNICATION DEVICE

CROSS REFERENCE TO RELATED APPLICATIONS

This application claims priority of Taiwan Patent Application No. 110143114 filed on Nov. 19, 2021, the entirety of which is incorporated by reference herein.

BACKGROUND OF THE INVENTION

Field of the Invention

The disclosure generally relates to a communication device, and more particularly, to a communication device with high isolation.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements of a mobile device supporting wireless communication. However, because of the small amount of internal space in the mobile device, the configuration of the antennas and their transmission lines are often very close, and they are likely to interfere with each other. Accordingly, it is necessary to propose a novel solution for solving the problem of low isolation in the conventional design.

BRIEF SUMMARY OF THE INVENTION

In an exemplary embodiment, the invention is directed to a communication device that includes a first ground element, a second ground element, a third ground element, a first signaling conductor, a second signaling conductor, a resonant circuit, and a dielectric substrate. The first signaling conductor is disposed between the first ground element and the second ground element. The second signaling conductor is disposed between the second ground element and the third ground element. The first signaling conductor is coupled through the resonant circuit to the first ground element. The dielectric substrate has a first surface and a second surface which are opposite to each other. The first ground element, the second ground element, the third ground element, the first signaling conductor, and the second signaling conductor are all disposed on the first surface of the dielectric substrate. The resonant circuit is configured to increase the isolation between the first signaling conductor and the second signaling conductor in a target frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
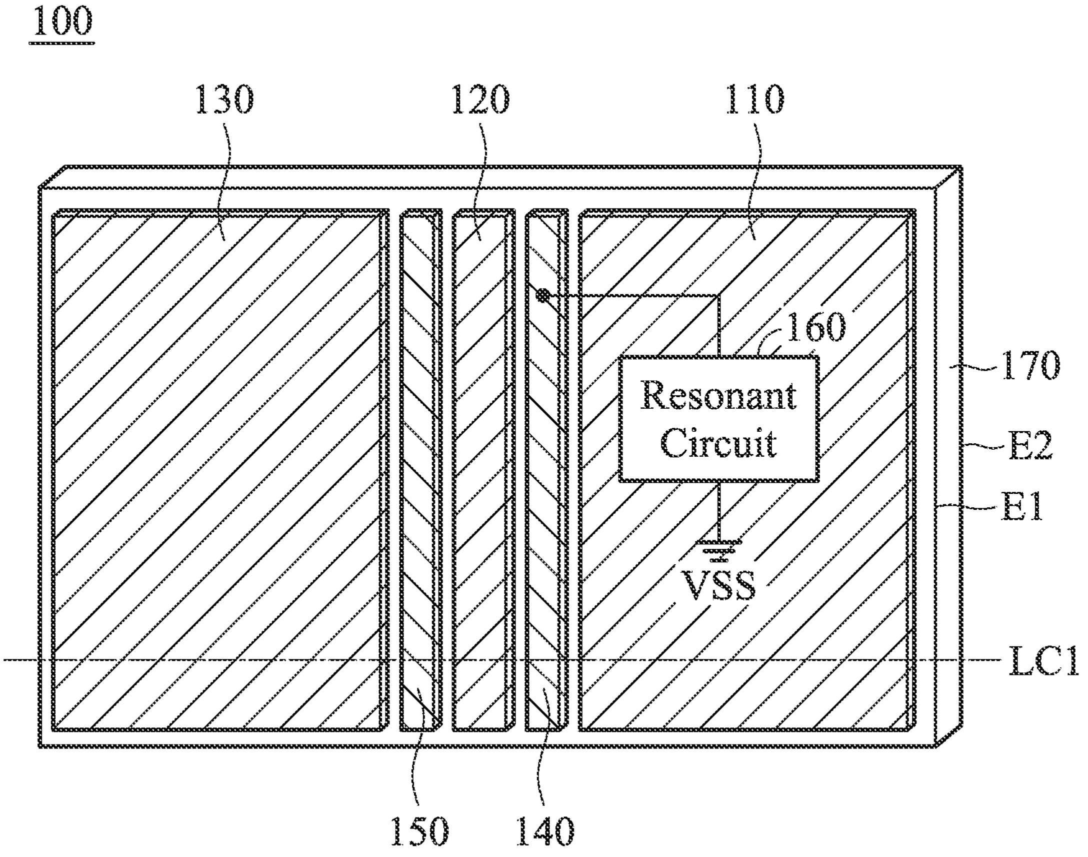
FIG. 1A is a top view of a communication device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
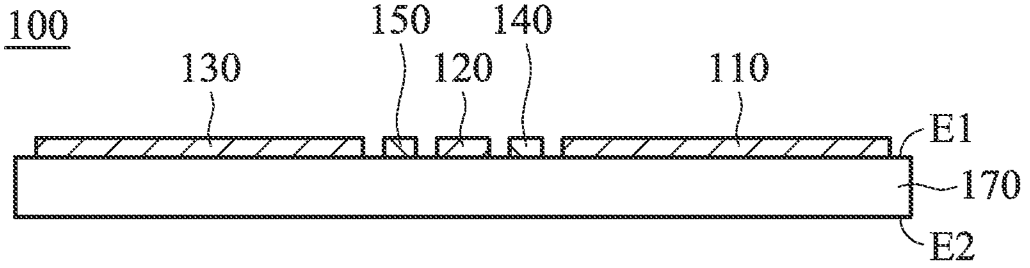
FIG. 1B is a sectional view of a communication device according to an embodiment of the invention.

FIG. 1A is a top view of a communication device 100 according to an embodiment of the invention. FIG. 1B is a sectional view of the communication device 100 according to an embodiment of the invention (along a sectional line LC1 of FIG. 1A). Please refer to FIG. 1A and FIG. 1B together. The communication device 100 may be applied to a mobile device, such as a smart phone, a tablet computer, or a notebook computer. In the embodiment of FIG. 1, the communication device 100 includes a first ground element 110, a second ground element 120, a third ground element 130, a first signaling conductor 140, a second signaling conductor 150, a resonant circuit 160, and a dielectric substrate 170. The first ground element 110, the second ground element 120, the third ground element 130, the first signaling conductor 140, and the second signaling conductor 150 may all be made of metal materials, such as copper, silver, aluminum, iron, or their alloys. It should be understood that the communication device 100 may further include other components, such as a processor, a touch control panel, a speaker, a power supply module, and/or a housing, although they are not displayed in FIG. 1A and FIG. 1B.

The first ground element 110, the second ground element 120, and the third ground element 130 can provide a ground voltage VSS. The first signaling conductor 140 may substantially have a straight-line shape. The first signaling conductor 140 is disposed between the first ground element 110 and the second ground element 120. The second signaling conductor 150 may substantially have another straight-line shape, which may be substantially parallel to the first signal conductor 140. The second signaling conductor 150 is disposed between the second ground element 120 and the third ground element 130. In some embodiments, the first signaling conductor 140 and the second signaling conductor 150 are completely separate from the first ground element 110, the second ground element 120, and the third ground element 130.

The first signaling conductor 140 is coupled through the resonant circuit 160 to the first ground element 110. In some embodiments, the first signaling conductor 140 and the resonant circuit 160 are coupled in parallel with the first ground element 110, but they are not limited thereto. It should be noted that the resonant circuit 160 is configured to increase the isolation between the first signaling conductor 140 and the second signaling conductor 150 in a target frequency band. That is, within the aforementioned target frequency band, the first signaling conductor 140 and the second signaling conductor 150 do not tend to interfere with each other.

The dielectric substrate 170 may be an FR4 (Flame Retardant 4) substrate, a PCB (Printed Circuit Board), or an FPC (Flexible Printed Circuit). The dielectric substrate 170 has a first surface E1 and a second surface E2 with are opposite to each other. The first ground element 110, the second ground element 120, the third ground element 130, the first signaling conductor 140, and the second signaling conductor 150 may all be disposed on the first surface E1 of the dielectric substrate 170.

The following embodiments will introduce different configurations and detailed structural features of the communication device. It should be understood that these figures and descriptions are merely exemplary, rather than limitations of the invention.

Figure 2A:
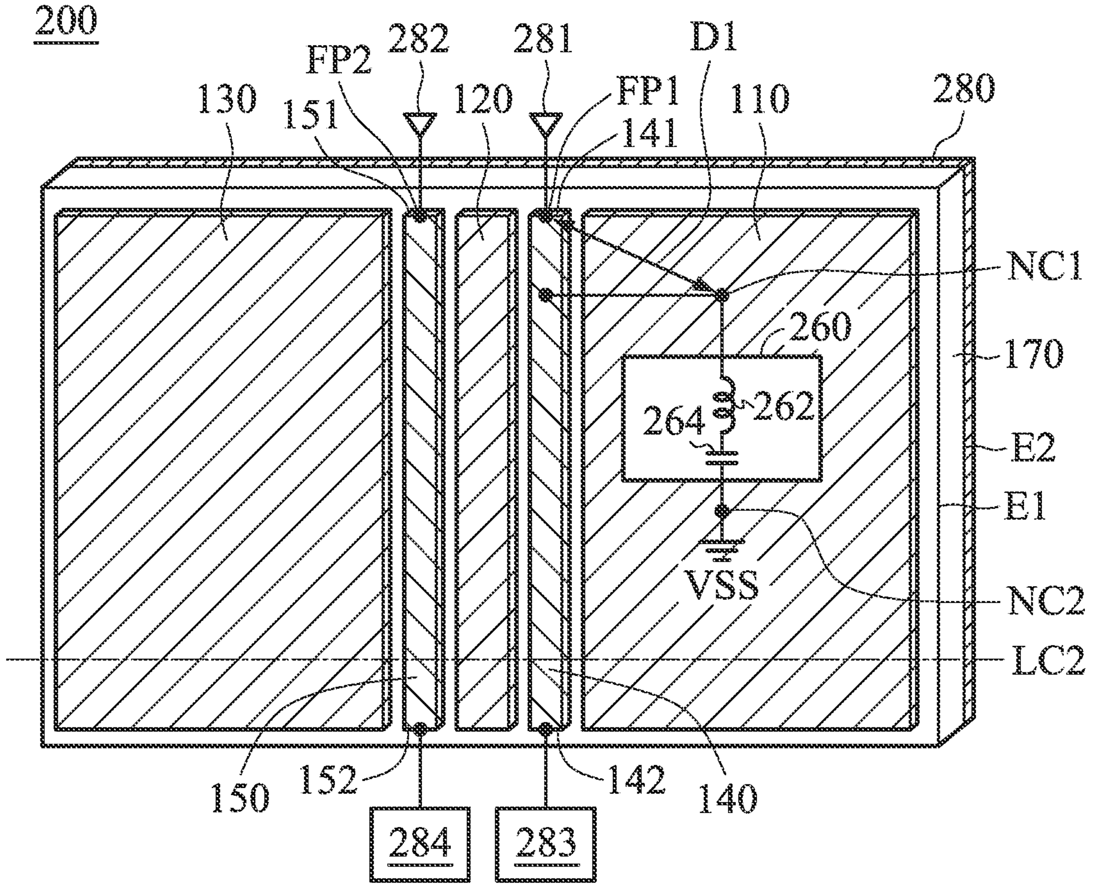
FIG. 2A is a top view of a communication device according to an embodiment of the invention.
Figure 2B:
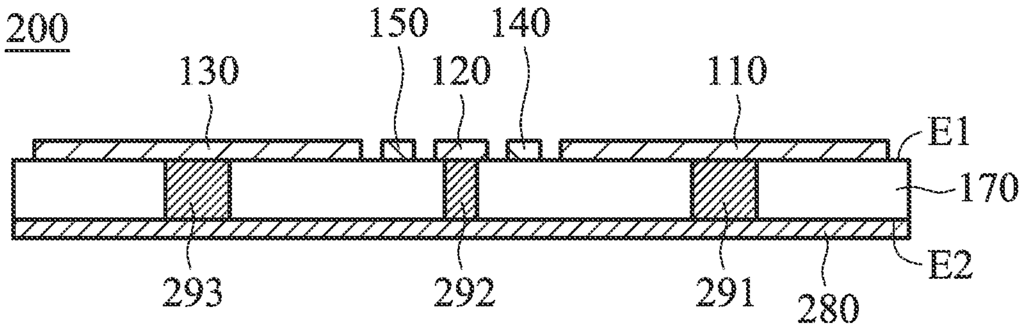
FIG. 2B is a sectional view of a communication device according to an embodiment of the invention.

FIG. 2A is a top view of a communication device 200 according to an embodiment of the invention. FIG. 2B is a sectional view of the communication device 200 according to an embodiment of the invention (along a sectional line LC2 of FIG. 2A). FIG. 2A and FIG. 2B are similar to FIG. 1A and FIG. 1B. In the embodiment of FIG. 2A and FIG. 2B, the communication device 200 further includes a system ground plane 280, a first conductive via element 291, a second conductive via element 292, and a third conductive via element 293. The system ground plane 280 is disposed on the second surface E2 of the dielectric substrate 170. The first conductive via element 291 penetrates the dielectric substrate 170. The first ground element 110 is coupled through the first conductive via element 291 to the system ground plane 280. The second conductive via element 292 penetrates the dielectric substrate 170. The second ground element 120 is coupled through the second conductive via element 292 to the system ground plane 280. The third conductive via element 293 penetrates the dielectric substrate 170. The third ground element 130 is coupled through the third conductive via element 293 to the system ground plane 280. The incorporation of the system ground plane 280, the first conductive via element 291, the second conductive via element 292, and the third conductive via element 293 can help to reduce the transmission loss of the communication device 200.

The first signaling conductor 140 has a first end 141 and a second end 142. A first feeding point FP1 is positioned at the first end 141 of the first signaling conductor 140. The first feeding point FP1 may be further coupled to a first antenna 281. The second signaling conductor 150 has a first end 151 and a second end 152. A second feeding point FP2 is positioned at the first end 151 of the second signaling conductor 150. The second feeding point FP2 may be further coupled to a second antenna 282. Furthermore, the second end 142 of the first signaling conductor 140 may be further coupled to a first RF (Radio Frequency) module 283, and the second end 152 of the second signaling conductor 150 may be further coupled to a second RF module 284. For example, the first antenna 281 may be excited by the first RF module 283 through the first signaling conductor 140, and the second antenna 282 may be excited by the second RF module 284 through the second signaling conductor 150.

In the embodiment of FIG. 2A and FIG. 2B, a resonant circuit 260 of the communication device 200 includes an inductive element 262 and a capacitive element 264. Specifically, the resonant circuit 260 has a first connection point NC1 coupled to the first signaling conductor 140, and a second connection point NC2 coupled to the first ground element 110. The inductive element 262 and the capacitive element 264 are coupled in series between the first connection point NC1 and the second connection point NC2. The connection order of the inductive element 262 and the capacitive element 264 is not limited in the invention. In alternative embodiments, the positions of the inductive element 262 and the capacitive element 264 are exchangeable with each other. It should be noted the first connection point NC1 is adjacent to the first feeding point FP1. The term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0).

Figure 3:
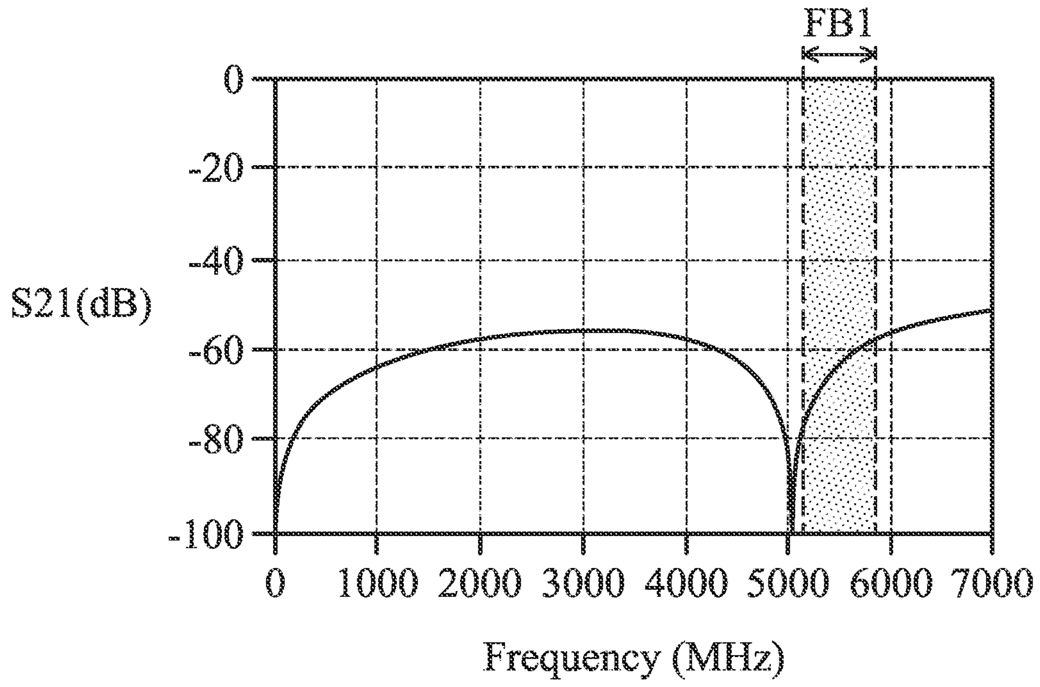
FIG. 3 is a diagram of the S-parameter of a communication device according to an embodiment of the invention.

FIG. 3 is a diagram of the S-parameter of the communication device 200 according to an embodiment of the invention. The horizontal axis represents the operational frequency (MHz), and the vertical axis represents the S-parameter (dB). If the first feeding point FP1 is set as a first port (Port 1) and the second feeding point FP2 is set as a second port (Port 2), the S21 parameter therebetween will be shown in FIG. 3. According to the measurement of FIG. 3, by using the resonant circuit 260, the isolation between the first signaling conductor 140 and the second signaling conductor 150 in a target frequency band FB1 can be improved by about 36 dB. For example, the target frequency band FB1 may be from 5150 MHz to 5850 MHz, but it is not limited thereto. In some embodiments, the central frequency FC of the target frequency band FB1 is described as the following equation (1):

$$FC = \frac{1}{2\pi} \cdot \frac{1}{\sqrt{L \cdot C}} \quad (1)$$

where "FC" represents the central frequency FC, "L" represents the inductance of the inductive element 262, and "C" represents the capacitance of the capacitive element 264.

Generally, the first signaling conductor 140 is mainly configured to transmit signals within a first frequency band, and the second signaling conductor 150 is mainly configured to transmit signals within a second frequency band. For example, the first frequency band may be from 2400 MHz to 2500 MHz, and the second frequency band may be from 5150 MHz to 5850 MHz. The second frequency band may overlap the target frequency band FB1. Since the resonant circuit 260 can absorb the current distributions within the target frequency band FB1, the communication device 200 of the invention can effectively avoid the interference between the first signaling conductor 140 and the second signaling conductor 150 (especially for the target frequency band FB1). In addition, according to practical measurements, if the distance D1 between the first connection point NC1 and the first feeding point FP1 is from 0 mil to 100 mil, the isolating function of the resonant circuit 260 can be further enhanced. Other features of the communication device 200 of FIG. 2A and FIG. 2B are similar to those of the communication device 100 of FIG. 1A and FIG. 1B. Accordingly, the two embodiments can achieve similar levels of performance. Next, the following embodiments will introduce a variety of possible detailed structures of the inductive element 262 and the capacitive element 264.

Figure 4A:
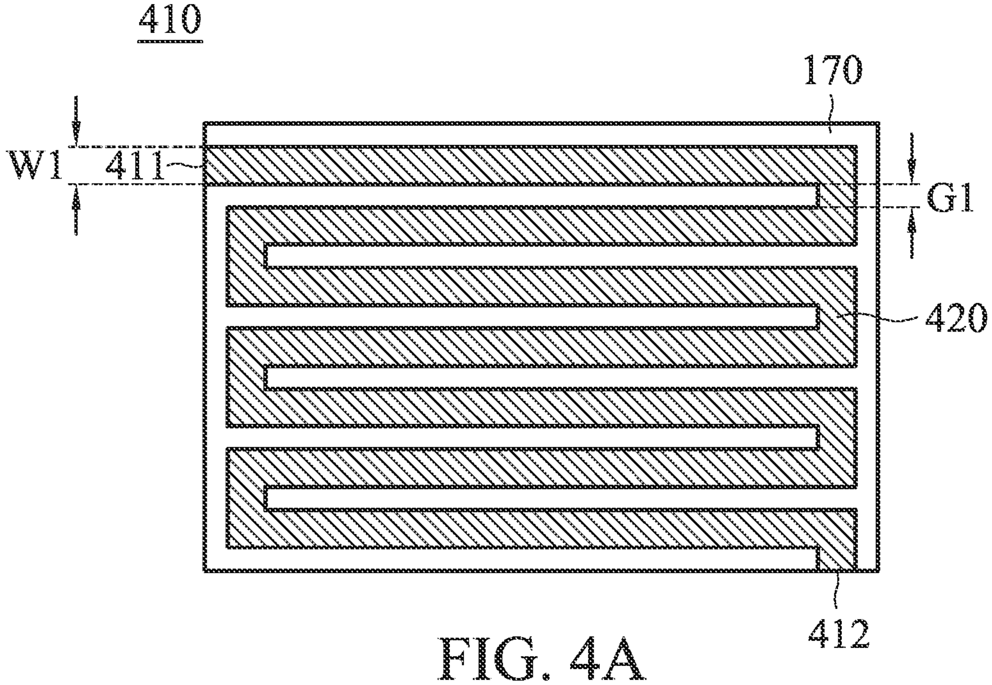
FIG. 4A is a top view of an inductive element according to an embodiment of the invention.

FIG. 4A is a top view of an inductive element 410 according to an embodiment of the invention. In the embodiment of FIG. 4A, the inductive element 410 includes a meandering conductor 420, which is disposed on the first surface E1 of the dielectric substrate 170. For example, the meandering conductor 420 may include a plurality of U-shaped portions coupled with each other. The inductive element 410 has a first terminal point 411 and a second terminal point 412, which may be positioned at two ends of the meandering conductor 420, respectively. With respect to element sizes, the width W1 of the meandering conductor 420 may be from 2 mil to 10 mil, and the width of the gap G1 of the meandering conductor 420 may be from 2 mil to 10 mil.

Figure 4B:
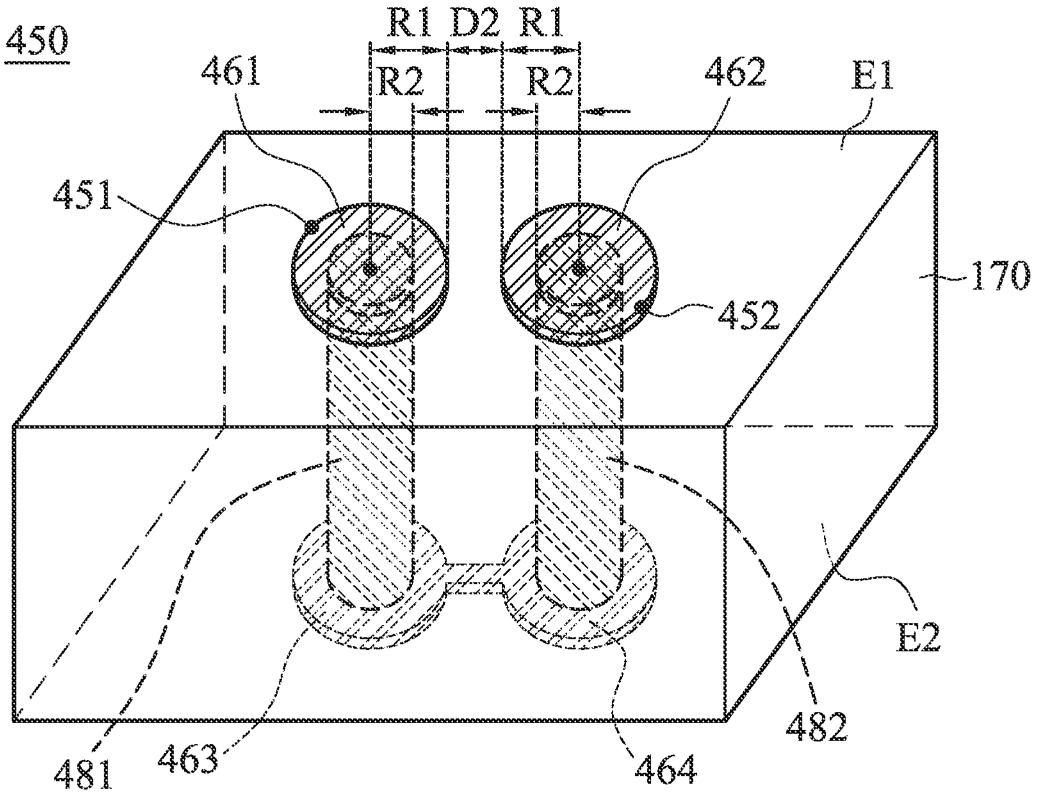
FIG. 4B is a perspective view of an inductive element according to an embodiment of the invention.

FIG. 4B is a perspective view of an inductive element 450 according to an embodiment of the invention. In the embodiment of FIG. 4B, the inductive element 450 includes a first conductive pad 461, a second conductive pad 462, a third conductive pad 463, a fourth conductive pad 464, a first connection via element 481, and a second connection via element 482. The inductive element 450 has a first terminal point 451 and a second terminal point 452. The first terminal point 451 is positioned at the first conductive pad 461. The second terminal point 452 is positioned at the second conductive pad 462. For example, each of the first conductive pad 461, the second conductive pad 462, the third conductive pad 463, and the fourth conductive pad 464 may substantially have a circular shape with a radius R1. The first conductive pad 461 and the second conductive pad 462 are both disposed on the first surface E1 of the dielectric substrate 170. The third conductive pad 463 and the fourth conductive pad 464 are both disposed on the second surface E2 of the dielectric substrate 170. The fourth conductive pad 464 is further coupled to the third conductive pad 463. For example, each of the first connection via element 481 and the second connection via element 482 may substantially have a cylindrical shape with a radius R2. The first connection via element 481 penetrates the dielectric substrate 170. The first connection via element 481 is coupled between the first conductive pad 461 and the third conductive pad 463. The second connection via element 482 penetrates the dielectric substrate 170. The second connection via element 482 is coupled between the second conductive pad 462 and the fourth conductive pad 464. With respect to element sizes, the radius R1 of the aforementioned circular shape may be from 4 mil to 12 mil, the radius R1 of the aforementioned circular shape may be substantially twice the radius R2 of the aforementioned cylindrical shape (i.e., R1=2·R2), and the distance D2 between the first conductive pad 461 and the second conductive pad 462 may be longer than or equal to 2 mil.

Figure 5A:
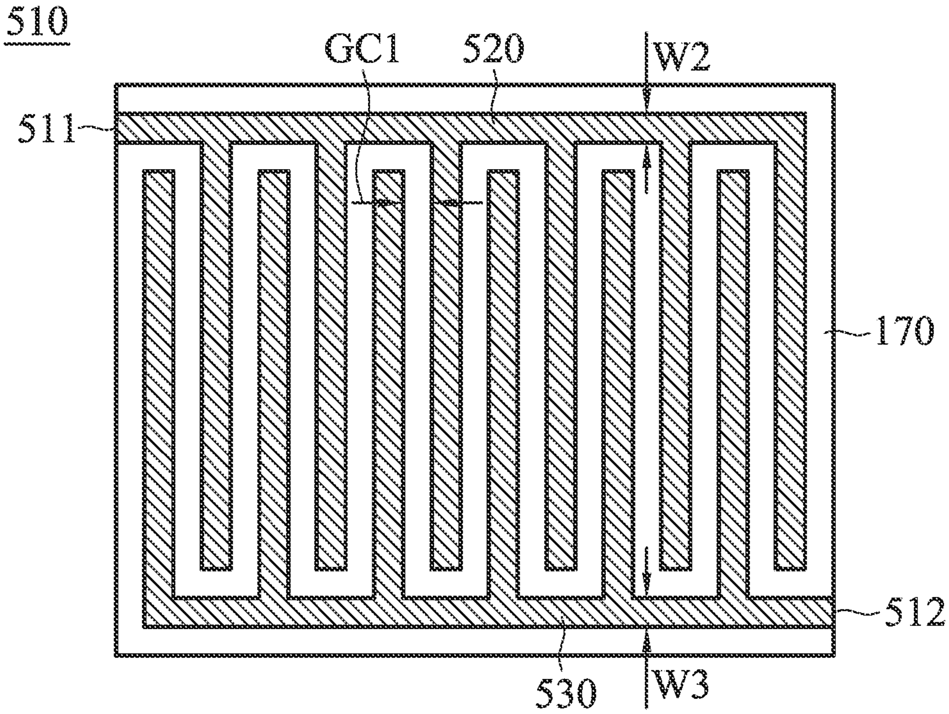
FIG. 5A is a top view of a capacitive element according to an embodiment of the invention.

FIG. 5A is a top view of a capacitive element 510 according to an embodiment of the invention. In the embodiment of FIG. 5A, the capacitive element 510 includes a first conductor 520 and a second conductor 530, which may be disposed on the first surface E1 of the dielectric substrate 170. The capacitive element 510 has a first terminal point 511 and a second terminal point 512. The first terminal point 511 is positioned at an end of the first conductor 520. The second terminal point 512 is positioned at an end of the second conductor 530. The second conductor 530 is adjacent to the first conductor 520, but the second conductor 530 is completely separate from the first conductor 520. A coupling gap GC1 is formed between the second conductor 530 and the first conductor 520. For example, each of the first conductor 520 and the second conductor 530 may include a plurality of E-shaped portions coupled with each other. Generally, the first conductor 520 and the second conductor 530 are substantially interleaved with each other. With respect to element sizes, the width W2 of the first conductor 520 may be from 2 mil to 10 mil, the width W3 of the second conductor 530 may be from 2 mil to 10 mil, and the width of the coupling gap GC1 may be from 2 mil to 10 mil.

Figure 5B:
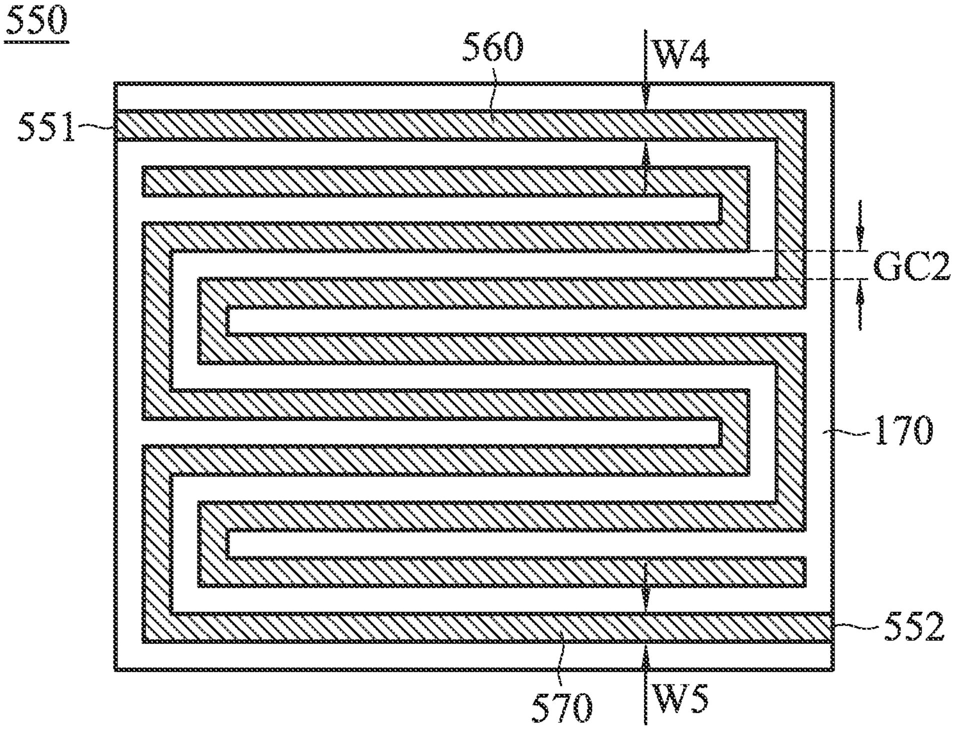
FIG. 5B is a top view of a capacitive element according to an embodiment of the invention.

FIG. 5B is a top view of a capacitive element 550 according to an embodiment of the invention. In the embodiment of FIG. 5B, the capacitive element 550 includes a first conductor 560 and a second conductor 570, which may be disposed on the first surface E1 of the dielectric substrate 170. The capacitive element 550 has a first terminal point 551 and a second terminal point 552. The first terminal point 551 is positioned at an end of the first conductor 560. The second terminal point 552 is positioned at an end of the second conductor 570. The second conductor 570 is adjacent to the first conductor 560, but the second conductor 570 is completely separate from the first conductor 560. A coupling gap GC2 is formed between the second conductor 570 and the first conductor 560. For example, each of the first conductor 560 and the second conductor 570 may include a plurality of U-shaped portions coupled with each other. Generally, the first conductor 560 and the second conductor 570 are substantially parallel to each other. With respect to element sizes, the width W4 of the first conductor 560 may be from 2 mil to 10 mil, the width W5 of the second conductor 570 may be from 2 mil to 10 mil, and the width of the coupling gap GC2 may be from 2 mil to 10 mil.

Figure 6A:
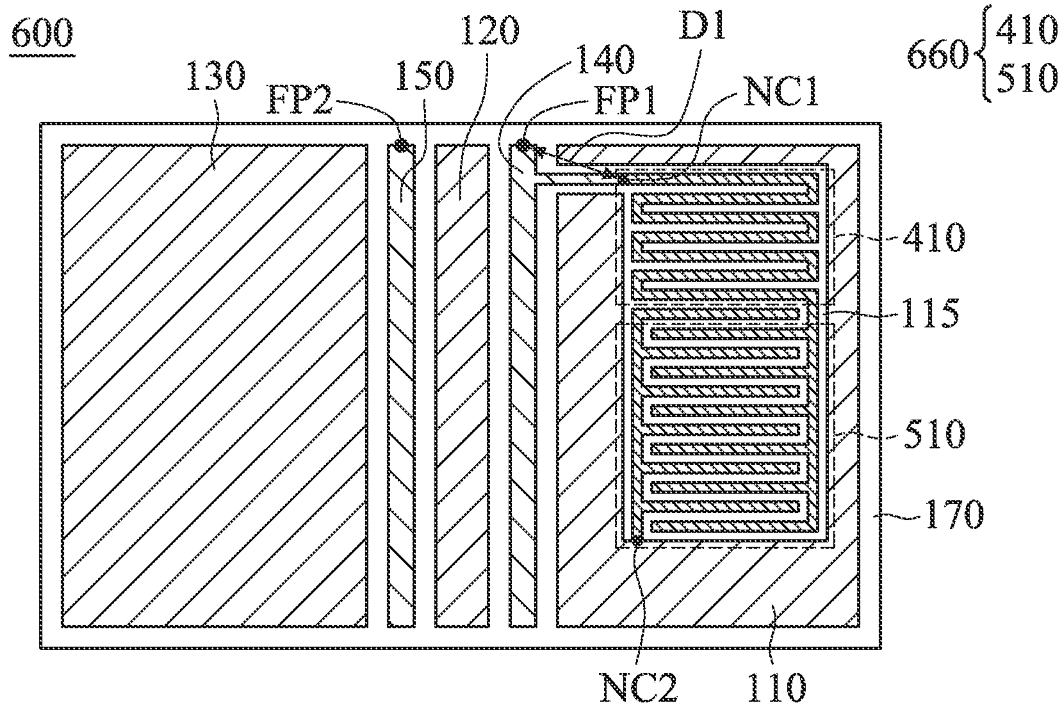
FIG. 6A is a top view of a communication device according to an embodiment of the invention.
Figure 6B:
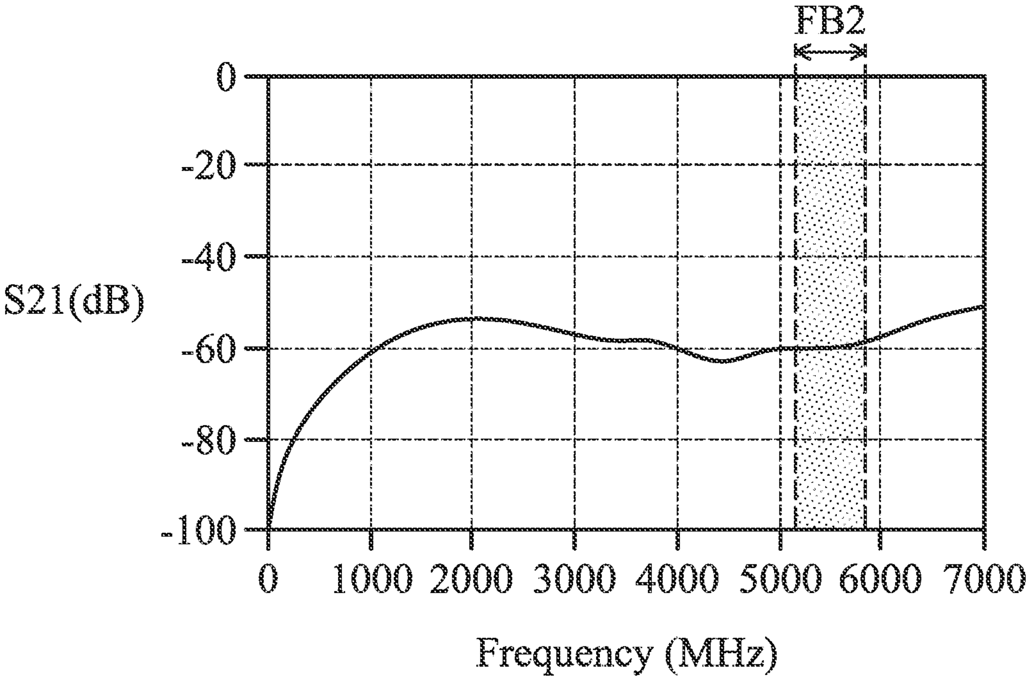
FIG. 6B is a diagram of the S-parameter of a communication device according to an embodiment of the invention.

FIG. 6A is a top view of a communication device 600 according to an embodiment of the invention. In the embodiment of FIG. 6A, a resonant circuit 660 of the communication device 600 includes the inductive element 410 and the capacitive element 510 coupled in series. Furthermore, the first ground element 110 may further have a hollow region 115 for accommodating the resonant circuit 660. FIG. 6B is a diagram of the S-parameter of the communication device 600 according to an embodiment of the invention. According to the measurement of FIG. 6B, by using the resonant circuit 660, the isolation between the first signaling conductor 140 and the second signaling conductor 150 in a target frequency band FB2 may be improved by about 9.4 dB. For example, the target frequency band FB2 may be from 5150 MHz to 5850 MHz, but it is not limited thereto. Other features of the communication device 600 of FIG. 6A and FIG. 6B are similar to those of the communication device 200 of FIG. 2A and FIG. 2B. Accordingly, the two embodiments can achieve similar levels of performance.

Figure 7A:
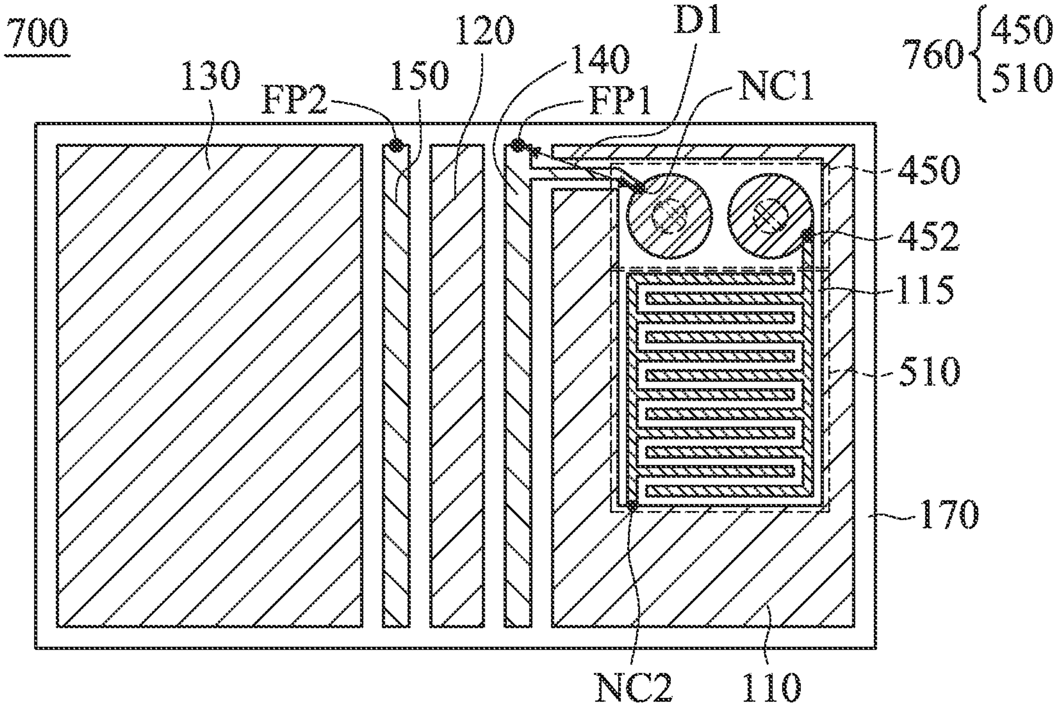
FIG. 7A is a top view of a communication device according to an embodiment of the invention.
Figure 7B:
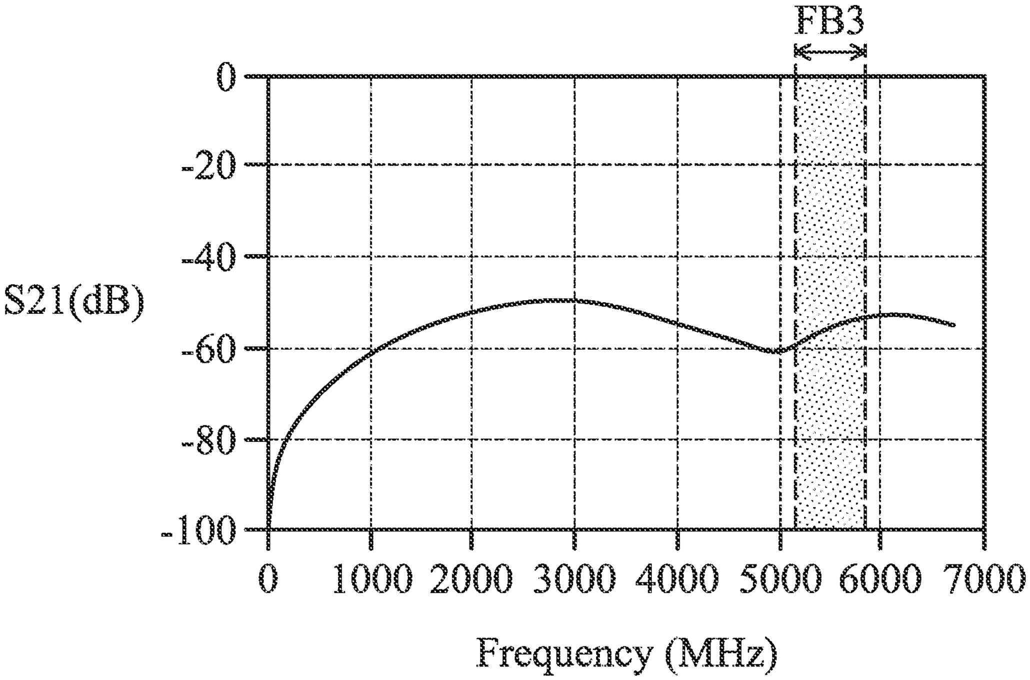
FIG. 7B is a diagram of the S-parameter of a communication device according to an embodiment of the invention.

FIG. 7A is a top view of a communication device 700 according to an embodiment of the invention. In the embodiment of FIG. 7A, a resonant circuit 760 of the communication device 700 includes the inductive element 450 and the capacitive element 510 coupled in series. FIG. 7B is a diagram of the S-parameter of the communication device 700 according to an embodiment of the invention. According to the measurement of FIG. 7B, by using the resonant circuit 760, the isolation between the first signaling conductor 140 and the second signaling conductor 150 in a target frequency band FB3 may be improved by about 10.2 dB. For example, the target frequency band FB3 may be from 5150 MHz to 5850 MHz, but it is not limited thereto. Other features of the communication device 700 of FIG. 7A and FIG. 7B are similar to those of the communication device 200 of FIG. 2A and FIG. 2B. Accordingly, the two embodiments can achieve similar levels of performance.

Figure 8A:
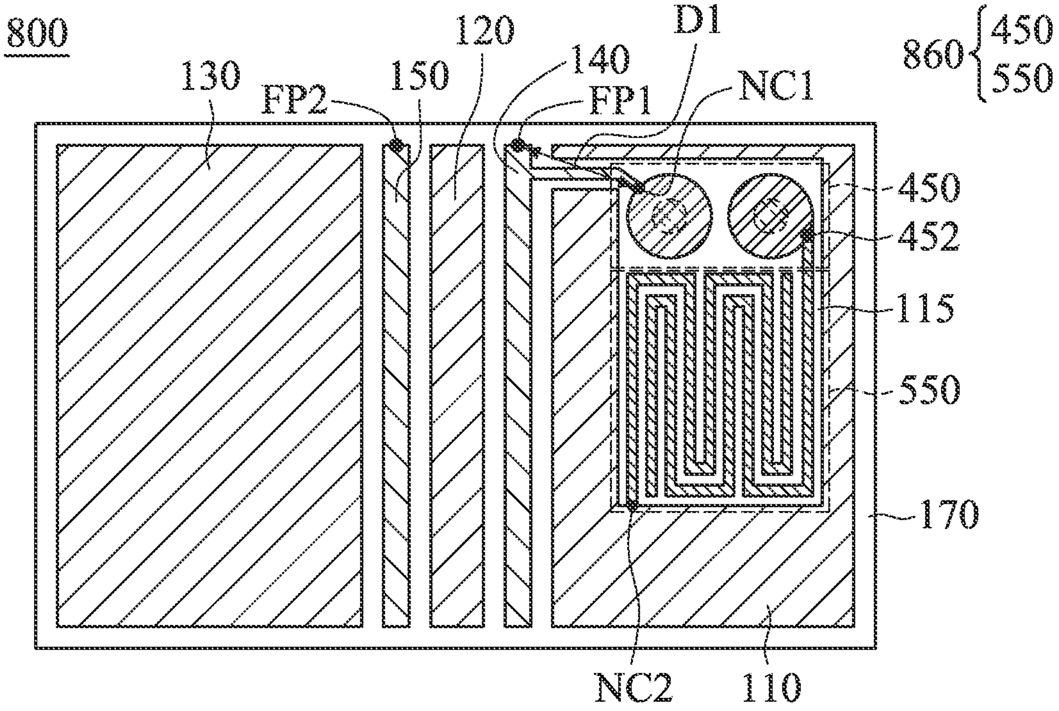
FIG. 8A is a top view of a communication device according to an embodiment of the invention.
Figure 8B:
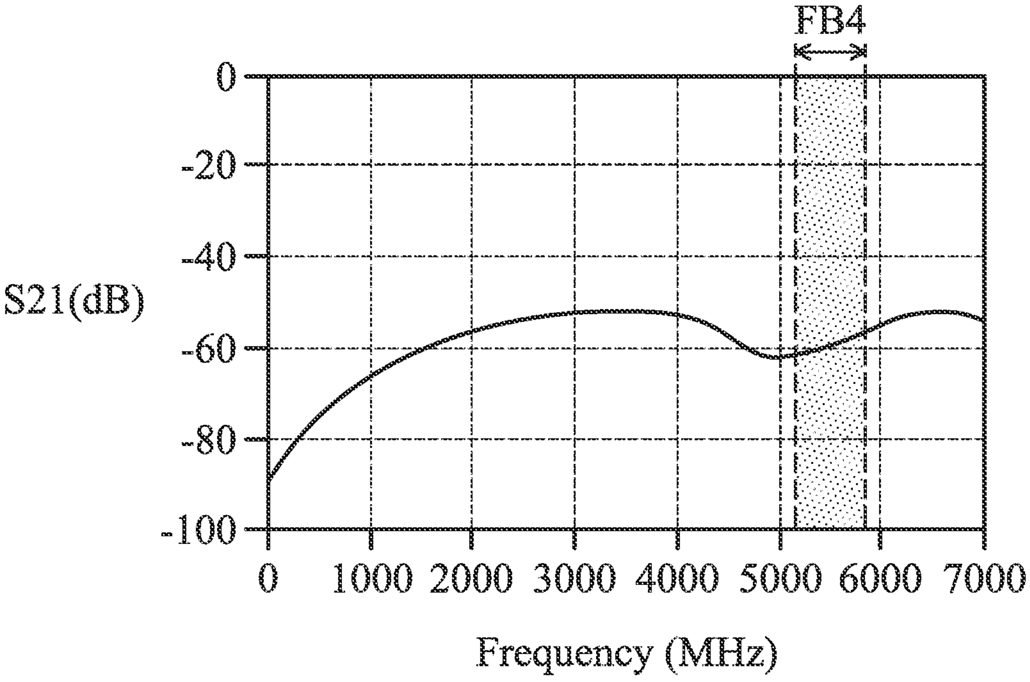
FIG. 8B is a diagram of the S-parameter of a communication device according to an embodiment of the invention.

FIG. 8A is a top view of a communication device 800 according to an embodiment of the invention. In the embodiment of FIG. 8A, a resonant circuit 860 of the communication device 800 includes the inductive element 450 and the capacitive element 550 coupled in series. FIG. 8B is a diagram of the S-parameter of the communication device 800 according to an embodiment of the invention. According to the measurement of FIG. 8B, by using the resonant circuit 860, the isolation between the first signaling conductor 140 and the second signaling conductor 150 in a target frequency band FB4 may be improved by about 10.4 dB. For example, the target frequency band FB4 may be from 5150 MHz to 5850 MHz, but it is not limited thereto. Other features of the communication device 800 of FIG. 8A and FIG. 8B are similar to those of the communication device 200 of FIG. 2A and FIG. 2B. Accordingly, the two embodiments can achieve similar levels of performance.

The invention proposes a novel communication device, which includes a resonant circuit integrated with a dielectric substrate. In comparison to the conventional design, the invention has at least the advantages of high isolation and low manufacturing cost. Therefore, the invention is suitable for application in a variety of mobile communication devices.

Note that the above element sizes, element shapes, and frequency ranges are not limitations of the invention. A designer can fine-tune these settings or values according to different requirements. It should be understood that the communication device of the invention is not limited to the configurations of FIGS. 1-8. The invention may merely include any one or more features of any one or more embodiments of FIGS. 1-8. In other words, not all of the features displayed in the figures should be implemented in the communication device of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication device, comprising:

a first ground element;

a second ground element;

a third ground element;

a first signaling conductor, disposed between the first ground element and the second ground element;

a second signaling conductor, disposed between the second ground element and the third ground element;

a resonant circuit, wherein the first signaling conductor is coupled through the resonant circuit to the first ground element; and a dielectric substrate, having a first surface and a second surface opposite to each other, wherein the first ground element, the second ground element, the third ground element, the first signaling conductor, and the second signaling conductor are disposed on the first surface of the dielectric substrate;

wherein the resonant circuit is configured to increase isolation between the first signaling conductor and the second signaling conductor in a target frequency band;

wherein the first signaling conductor has a first feeding point, and the second signaling conductor has a second feeding point;

wherein the resonant circuit has a first connection point coupled to the first signaling conductor and a second connection point coupled to the first ground element, and the first connection point is adjacent to the first feeding point;

wherein a distance between the first connection point and the first feeding point is from 0 mil to 100 mil;

wherein the resonant circuit comprises an inductive element and a capacitive element coupled in series;

wherein the capacitive element comprises:

a first conductor, disposed on the first surface of the dielectric substrate; and a second conductor, disposed on the first surface of the dielectric substrate, wherein the second conductor is adjacent to the first conductor;

wherein a coupling gap is formed between the first conductor and the second conductor, and a width of the coupling gap is from 2 mil to 10 mil.

2. The communication device as claimed in claim 1, wherein the first signaling conductor and the resonant circuit are coupled in parallel with the first ground element.

3. The communication device as claimed in claim 1, wherein the target frequency band is from 5150 MHz to 5850 MHz.

4. The communication device as claimed in claim 1, wherein the first signaling conductor and the second signaling conductor are completely separate from the first ground element, the second ground element, and the third ground element.

5. The communication device as claimed in claim 1, further comprising:

a system ground plane, disposed on the second surface of the dielectric substrate.

6. The communication device as claimed in claim 5, further comprising:

a first conductive via element, penetrating the dielectric substrate, wherein the first ground element is coupled through the first conductive via element to the system ground plane;

a second conductive via element, penetrating the dielectric substrate, wherein the second ground element is coupled through the second conductive via element to the system ground plane; and a third conductive via element, penetrating the dielectric substrate, wherein the third ground element is coupled through the third conductive via element to the system ground plane.

7. The communication device as claimed in claim 1, wherein the first feeding point is coupled to a first antenna, and the second feeding point is coupled to a second antenna.

8. The communication device as claimed in claim 1, wherein the inductive element comprises:

a meandering conductor, disposed on the first surface of the dielectric substrate.

9. The communication device as claimed in claim 1, wherein the inductive element comprises:

a first conductive pad, disposed on the first surface of the dielectric substrate;

a second conductive pad, disposed on the first surface of the dielectric substrate;

a third conductive pad, disposed on the second surface of the dielectric substrate;

a fourth conductive pad, disposed on the second surface of the dielectric substrate, and coupled to the third conductive pad;

a first connection via element, penetrating the dielectric substrate, and coupled between the first conductive pad and the third conductive pad; and a second connection via element, penetrating the dielectric substrate, and coupled between the second conductive pad and the fourth conductive pad.

10. The communication device as claimed in claim 9, wherein each of the first conductive pad, the second conductive pad, the third conductive pad, and the fourth conductive pad substantially has a circular shape.

11. The communication device as claimed in claim 10, wherein each of the first connection via element and the second connection via element substantially has a cylindrical shape.

12. A communication device, comprising:

a first ground element;

a second ground element;

a third ground element;

a first signaling conductor, disposed between the first ground element and the second ground element;

a second signaling conductor, disposed between the second ground element and the third ground element;

a resonant circuit, wherein the first signaling conductor is coupled through the resonant circuit to the first ground element; and a dielectric substrate, having a first surface and a second surface opposite to each other, wherein the first ground element, the second ground element, the third ground element, the first signaling conductor, and the second signaling conductor are disposed on the first surface of the dielectric substrate;

wherein the resonant circuit is configured to increase isolation between the first signaling conductor and the second signaling conductor in a target frequency band;

wherein the resonant circuit comprises an inductive element and a capacitive element coupled in series;

wherein the inductive element comprises:

a first conductive pad, disposed on the first surface of the dielectric substrate;

a second conductive pad, disposed on the first surface of the dielectric substrate;

a third conductive pad, disposed on the second surface of the dielectric substrate;

a fourth conductive pad, disposed on the second surface of the dielectric substrate, and coupled to the third conductive pad;

a first connection via element, penetrating the dielectric substrate, and coupled between the first conductive pad and the third conductive pad; and a second connection via element, penetrating the dielectric substrate, and coupled between the second conductive pad and the fourth conductive pad;

wherein each of the first conductive pad, the second conductive pad, the third conductive pad, and the fourth conductive pad substantially has a circular shape;

wherein each of the first connection via element and the second connection via element substantially has a cylindrical shape;

wherein a radius of the circular shape is substantially twice a radius of the cylindrical shape.

13. The communication device as claimed in claim 1, wherein the first conductor and the second conductor are substantially interleaved with each other.

14. The communication device as claimed in claim 1, wherein the first conductor and the second conductor are substantially parallel with each other.

* * * * *